United States Patent [19]

Miller et al.

[11] Patent Number: 5,349,132

[45] Date of Patent: Sep. 20, 1994

[54] METHODS AND APPARATUS FOR MODULAR COMPUTER CONSTRUCTION

[75] Inventors: Wayne H. Miller, Mountain View; Bradley C. Helm, Cupertino; Wayman M. Lee, Santa Clara; Braxton L. Lathrop, San Mateo; Jimmy A. Melton; Robert D. Chapman, both of San Jose, all of Calif.

[73] Assignee: Apple Computer, Inc., Cupertino, Calif.

[21] Appl. No.: 14,983

[22] Filed: Feb. 8, 1993

[51] Int. Cl.⁵ ............................................. H05K 9/00
[52] U.S. Cl. ................................. 174/35 R; 361/800
[58] Field of Search ............... 174/35 R, 32, 35 GC, 174/50; 361/600, 679, 683, 728, 736, 748, 796, 800

[56] References Cited

U.S. PATENT DOCUMENTS

| | | | |
|---|---|---|---|
| 4,728,160 | 3/1988 | Mondor et al. | 361/384 X |
| 4,821,146 | 4/1989 | Behrens et al. | 361/383 |
| 4,899,254 | 2/1990 | Ferchau et al. | 361/384 |
| 5,014,160 | 5/1991 | McCoy, Jr. | 174/35 R X |
| 5,067,041 | 11/1991 | Cooke et al. | 361/394 |

Primary Examiner—Leo P. Picard
Assistant Examiner—Christopher Horgan
Attorney, Agent, or Firm—Jeffrey J. Brooks

[57] ABSTRACT

A modular enclosure for personal computer systems, and methods for assembly of an enclosure. The enclosure substantially comprises a base, a unitary internal frame, a front and a back panel, and a U-shaped top cover. Frame-mounting snaps and cruciform members located on forward and rear portions of the frame mate to complimentary receiving openings in the base. Front and rear panels are mounted to the base, frame, and top cover by a plurality of panel-mounting snaps and hooks. A base electromagnetic interference (EMI) shield at the periphery of the shield having a plurality of planar tabbed fingers with hemispherical domes formed therein is then fitted and secured to the base such that the lateral edges of the fingers are recessed below a peripherally extending rim on the base. Thereafter, the internal frame is snapped into place upon the base, and a rear panel having an EMI shield fitted and secured to the base and frame by panel-mounting snaps and hooks. A front panel having a front EMI shield is then mounted and secured to the top cover. The top cover assembly is then lowered onto the base-frame assembly and slideably moved rearward until the rear edges of the top cover assembly contact a plurality of contact fingers formed in the rear EMI shield, the top cover assembly resting upon on the domes of the base EMI shield.

6 Claims, 16 Drawing Sheets

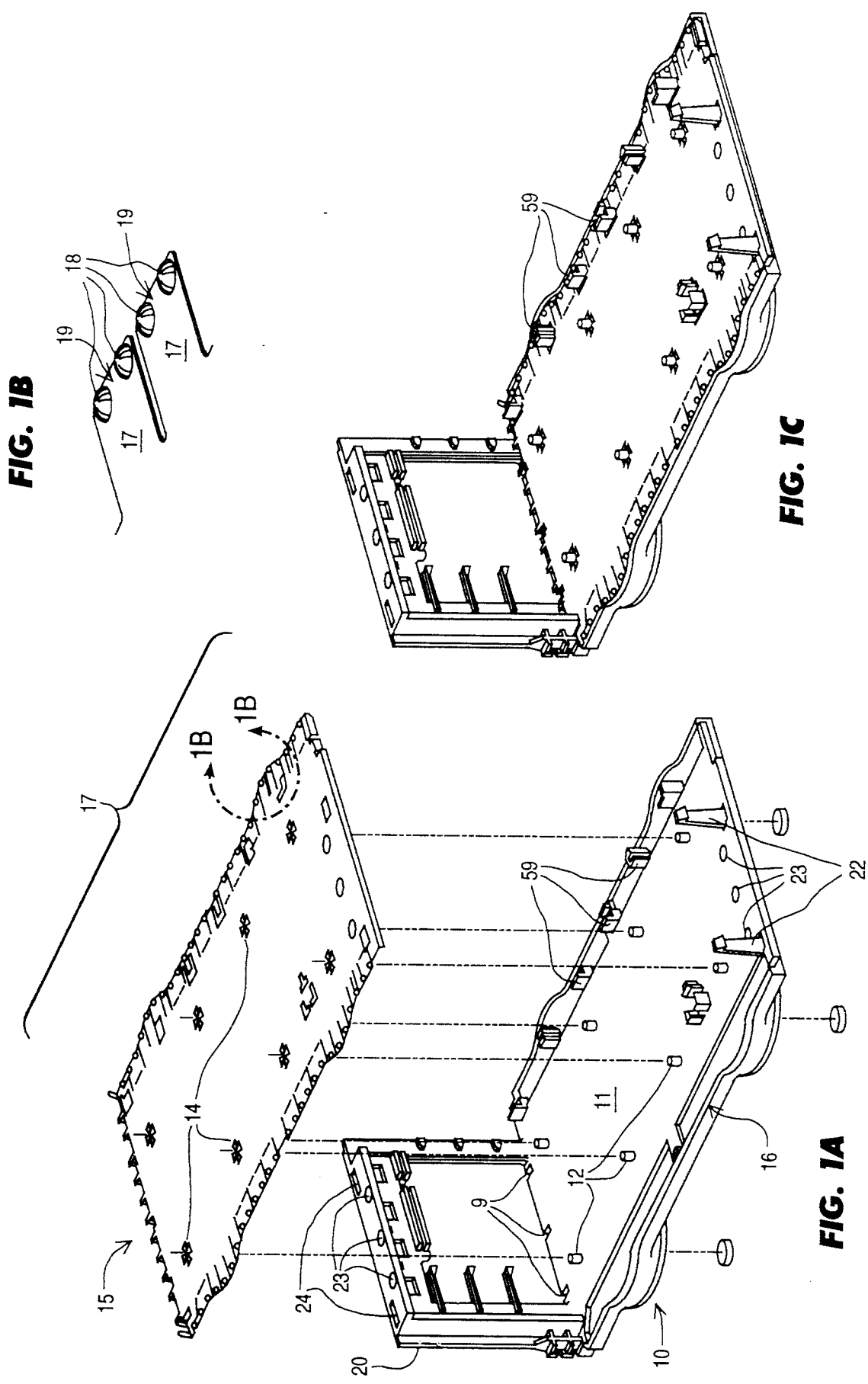

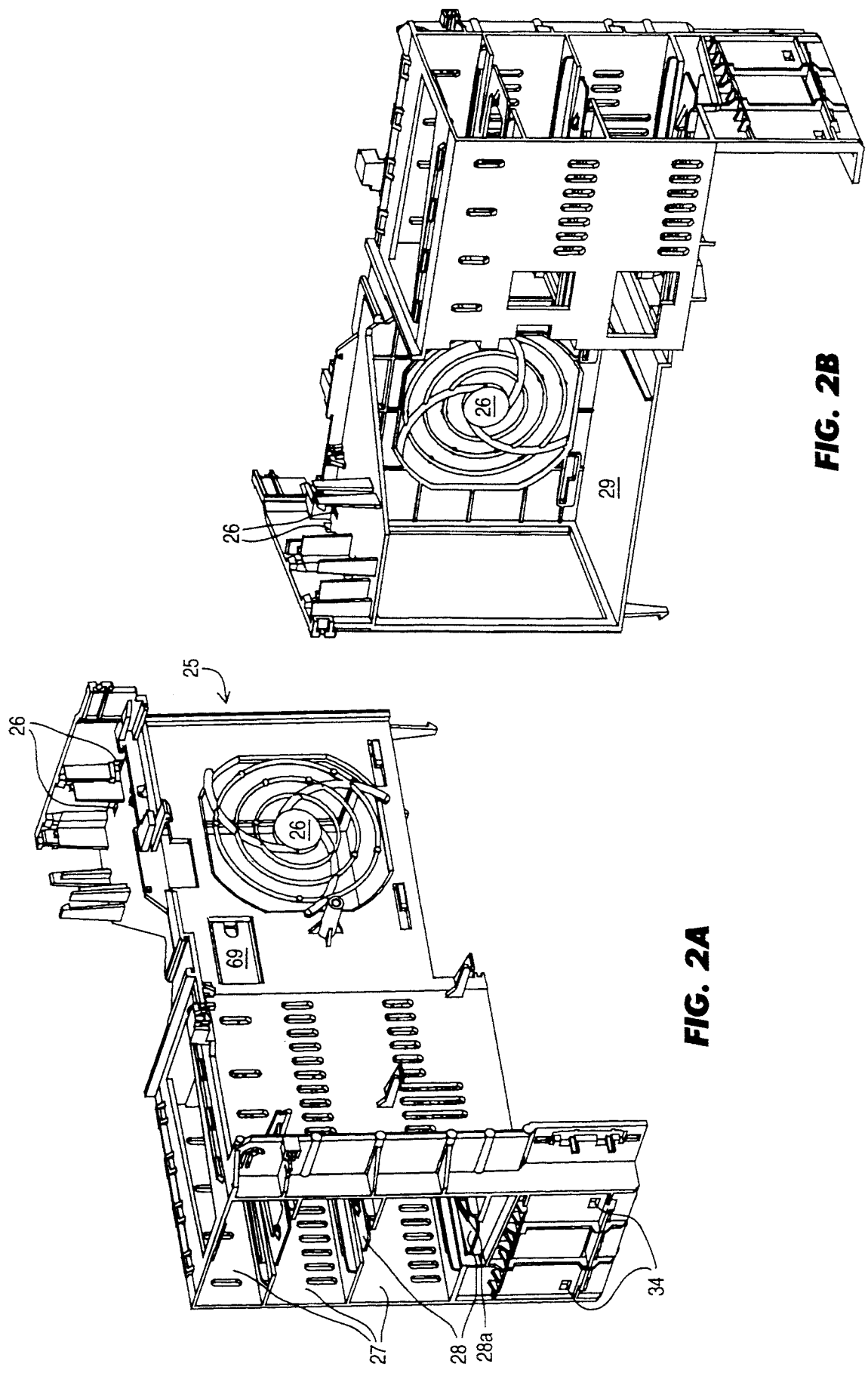

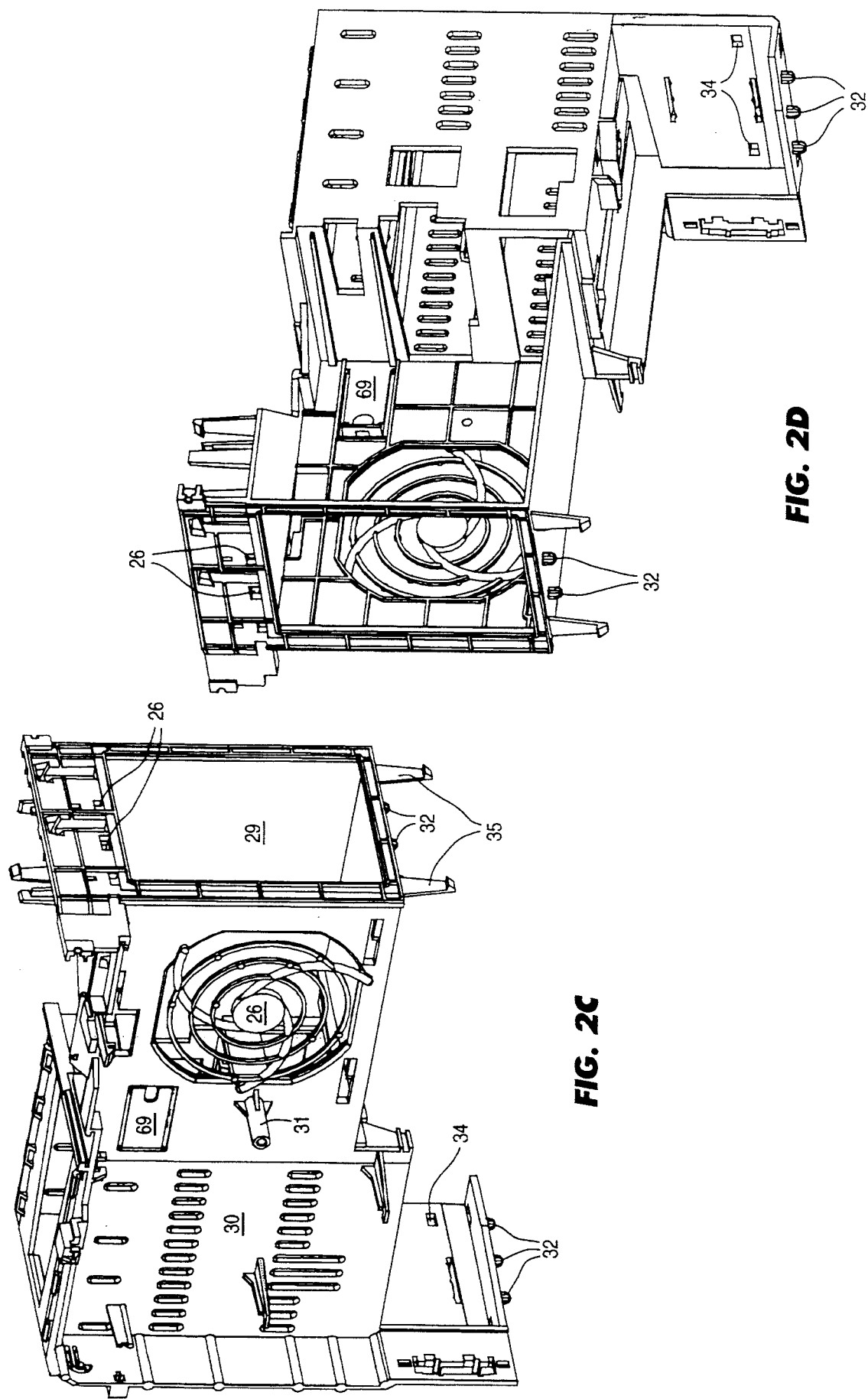

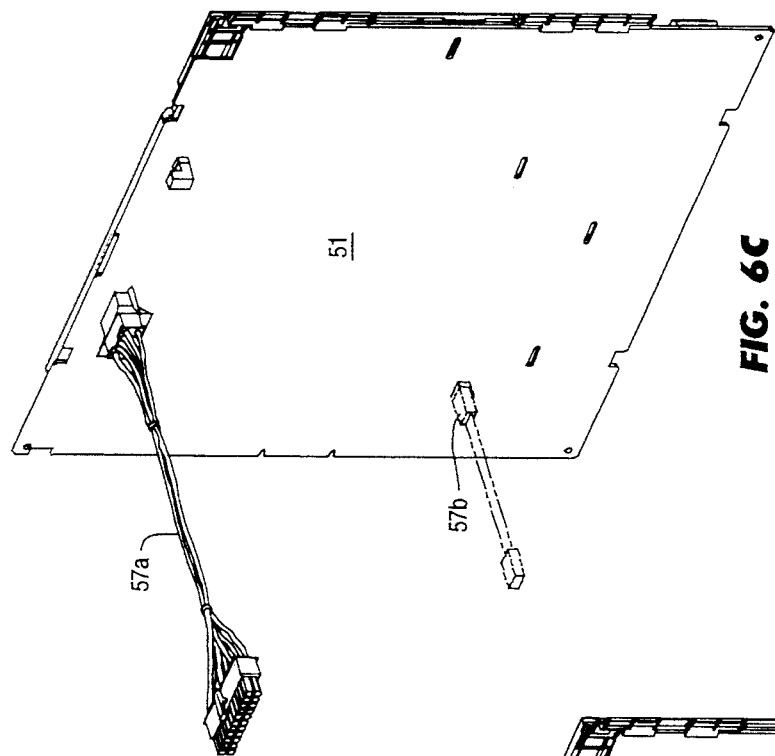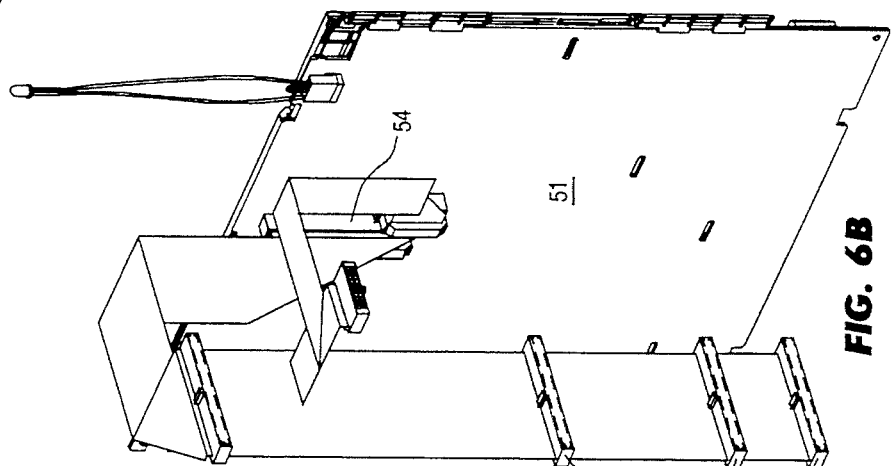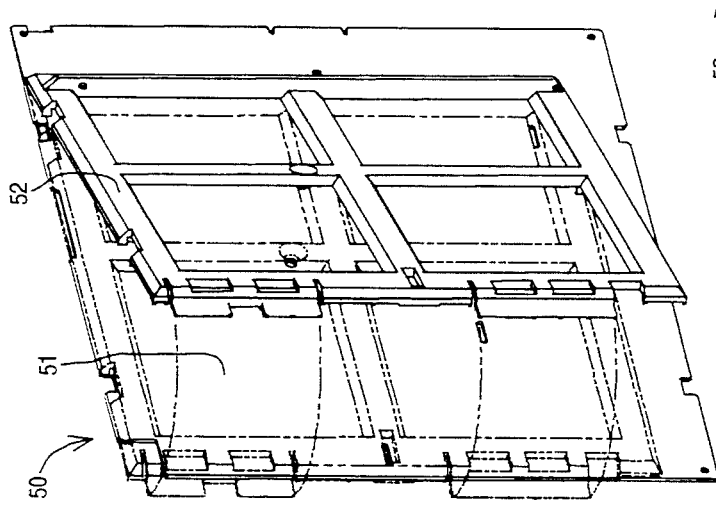

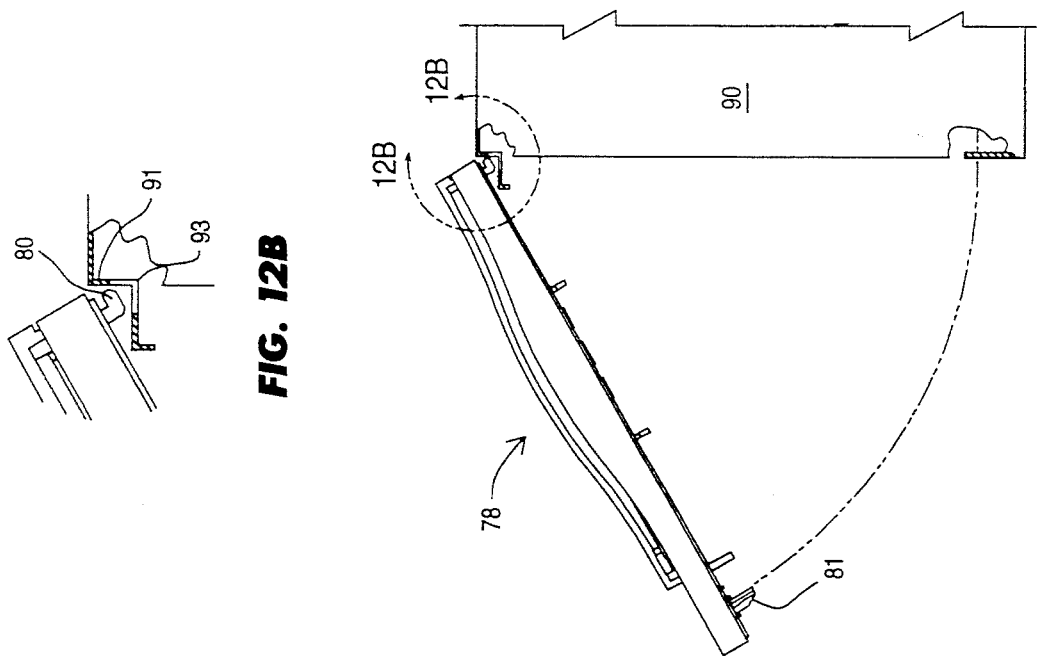
FIG. 12B
FIG. 12A
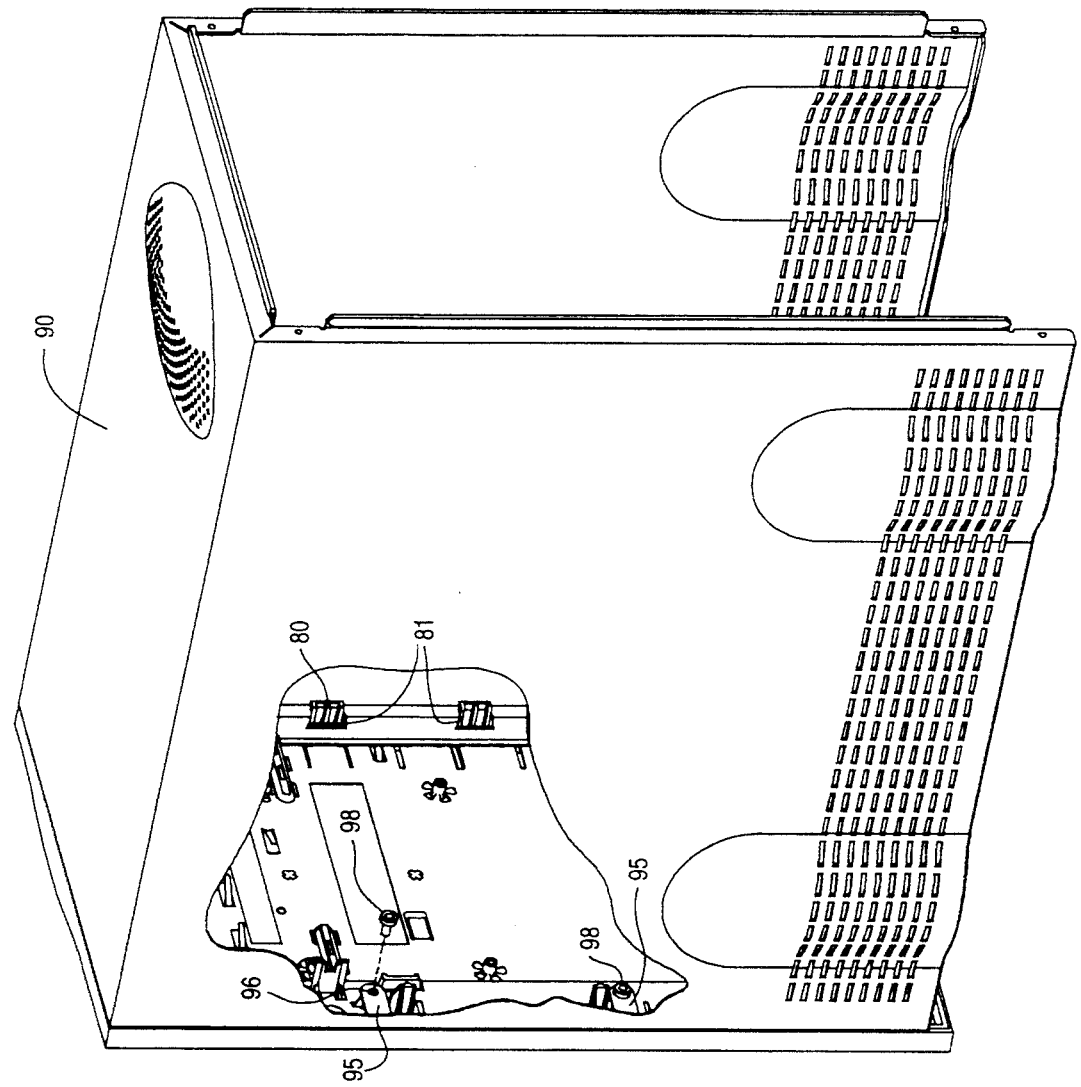
FIG. 12C

METHODS AND APPARATUS FOR MODULAR COMPUTER CONSTRUCTION

BACKGROUND OF THE INVENTION

1. Field of the Invention

The present invention relates generally to computer enclosure construction designs and methods. More particularly, the present invention relates to a personal computer enclosure designed to be assembled and to receive modular subassembly components substantially with minimal fasteners or other assembly hardware.

2. Art Background

Computer systems typically comprise numerous electronic and mechanical components and subsystems coupled together to function as a unit. For example, a common arrangement of component subparts forming a personal computer system might include a central processor unit (CPU), memory devices, and input and output (I/O) controllers coupled to a main processor board, with other peripheral devices (e.g., floppy, hard, or optical mass storage drives) and functional subassemblies (e.g., power supplies) mounted elsewhere within a housing or enclosure. The various peripheral and functional subsystems of the personal computer are connected to each other by wiring or other communication pathways.

In the prior art, the above subassemblies typically are installed into computer enclosures using straightforward mounting methods and hardware, including screws, clamps, rivets, and brackets. The computer housing itself frequently may comprise a substantially rectangular metal or plastic housing having threaded through-holes or spot-welded brackets and standoffs positioned to receive the above subassemblies. Frequently the mechanical strength of the enclosure is obtained by providing a metal chassis to receive and support the subassemblies, and mounting a plastic shell over the chassis to provide attractive cosmetics and finish. In such a case, subassemblies must be fastened onto the metal chassis with the above hardware using hand or machine tools. Additionally, large metal chassis may entail higher material costs and greater weight than comparable plastic parts.

Especially in the rapidly evolving field of personal computers, modularity and interchangeability of system subassemblies is of great importance to manufacturers, retailers, and users alike. In the case of a manufacturer, modularity is important because the manufacturer can more easily and cost effectively adapt to customer demands and technology changes without substantially redesigning or rebuilding existing products. Moreover, products can be more easily built at a central manufacturing site, and then customized for localized domestic and foreign use. Alternatively, a retailer can more easily update stocked but unsold computer systems as more powerful subassemblies become available, or to upgrade and service customers' computer systems. Customers benefit from modular system designs because they initially can purchase a base system which meets their present needs, and later expand their systems' performance and storage functions by replacing components to achieve higher performance. For example, a customer may wish to replace his existing processor board with a more powerful processor board, or to replace an existing disk drive with a higher capacity mass storage device, but without requiring a dealer or other service person to perform the upgrade.

Although prior art computer system designs may have included some modularity in that processor boards and mass storage devices could be replaced, such replacement typically requires that many of the subassemblies, especially those mounted near the top of the computer enclosure be removed to gain access to the lower mounted subassemblies. As a result, a substantial portion of any prior art computer system would have to be disassembled to install a new subassembly. For a manufacturer seeking to upgrade finished goods with a newly available product, such disassembly and reassembly can substantially increase labor costs, and therefore the final cost of the computer system.

As will be described in the following detailed description, the present invention overcomes many of the problems associated with prior art personal computer system enclosures by providing a simple, light weight yet robust, design comprising essentially five parts which can be substantially snapped together, and which uses only minimal traditional hardware elements. The enclosure is designed to receive all functional components and subassemblies necessary to the operation of a personal computer system without limiting access to any other subassembly. As a result, a personal computer system designed and assembled in accordance with the present invention can be easily and inexpensively reconfigured and updated by the manufacturer, retailer, or end user without need for time consuming disassembly and assembly operations.

SUMMARY OF THE INVENTION

A modular enclosure for personal computer systems, and methods for assembly of an enclosure, are disclosed. In one embodiment, the enclosure substantially comprises a base, an internal frame, a front and a back panel, and a U-shaped top cover. The internal frame comprises a single piece plastic molding with appropriately formed bays designed to receive various system subassemblies, such as floppy disk drives, hard disk drives, and the like. Each bay has an integrally formed flexible snap having a latch head to bear against and retain a subassembly placed in the bay. The base also has a plurality of frame-mounting snaps and cruciform members located on forward and rear portions of the frame which mate to complimentary receiving openings in the base. The front and rear panels have a plurality of panel-mounting snaps and hooks which are received by mating openings in the base, frame and top cover respectively.

A base electromagnetic interference (EMI) shield is then fitted and secured to the base. The base EMI shield comprises a plurality of planar tabbed fingers formed in the periphery of the shield, each finger having a hemispherical dome centrally disposed between lateral edges of each finger. The base EMI shield is attached to the base such that the lateral edges of the fingers are conformal to and recessed below a peripherally extending rim on the base. Thereafter the internal frame is located above, and snapped into place upon, the front and rear portions of the base. Thereafter, a rear EMI shield is fitted and secured to the back panel, and the panel maneuvered into position and secured the base and frame by the panel-mounting snaps and hooks.

A plurality of subassemblies, including disk drives, optical disk drives, power supplies, main processor printed circuit boards, and speaker housings are then placed into the respective bays and secured via a plurality of subassembly retaining snaps, guides, tabs, and other interlocking members. Electrical connection for the computer system is substantially established by routing an appropriately sized main cable bundle between the subassemblies, and connecting each subassembly to terminal ends of the cable bundle via a plurality of connectors. Additional wiring needs can be accommodated by providing and routing one or more secondary cable bundles between particular subassemblies, as for example between the main processor board and the speaker housing.

A front EMI shield is then secured to the front panel, and the panel maneuvered into a closed position relative to the rear of the U-shaped top cover via hooks formed on one lateral edge of the panel. The front panel is secured to the top cover by panel-mounting snaps formed on the opposing lateral edge mating to receiving openings in the top cover, thereby forming a four-sided top cover assembly. One or more bezels is detachably mounted to the front panel via hooks and snaps to permit access to the subassembly devices frontally mounted in the bays of the built up base-frame assembly. Each bezel may be fitted with EMI shielding as necessary to mate to the subassembly housing or the front EMI shield to effect a continuous EMI shield at the front portion of the computer system.

Finally, the top cover is lowered onto and slideably moved rearward upon a pair of inclined standoffs until the rear edges of the top cover assembly contact a plurality of contact fingers formed in the rear EMI shield, the top cover assembly resting upon on the dome-like structures of the base EMI shield fitted to the base-frame assembly. The top cover assembly is securely fastened to the built up base-frame assembly by conventional thumbscrews extending through the rear panel into complementary threaded through-holes in the rear flange of the top cover assembly, and by a lower edge of the front panel bearing against an extended lip formed in the front portion of the base.

BRIEF DESCRIPTION OF THE DRAWINGS

The present invention will be understood more fully from the detailed description given below and from the accompanying drawings of the preferred embodiment of the invention in which:

FIGS. 1a-c are perspective views of the formation of a base assembly of a personal computer enclosure.

FIGS. 2a-d are perspective views of an internal frame.

FIGS. 6a-c illustrate the formation of a main circuit board assembly.

FIGS. 12a-c illustrate the installation of a top cover assembly.

DETAILED DESCRIPTION OF THE INVENTION

Figure 4:
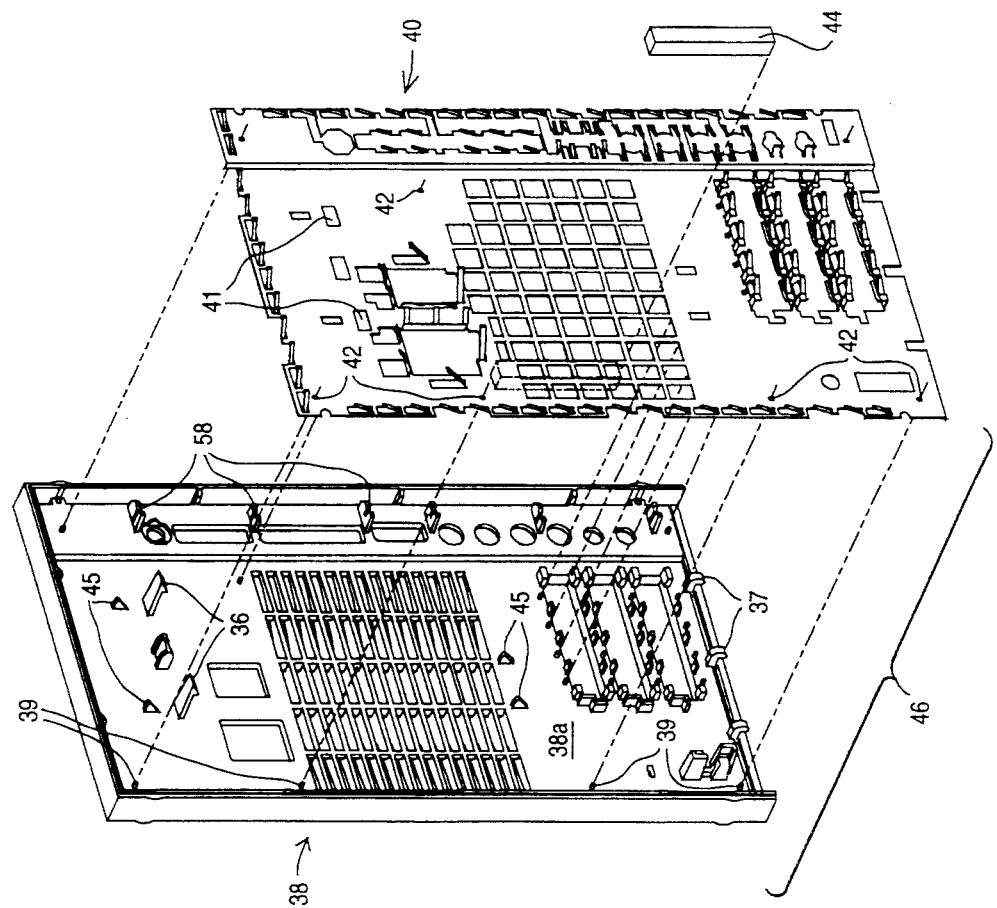
FIG. 4 illustrates the formation of a rear panel assembly.

The present invention discloses a modular enclosure for personal computer systems, and methods for assembly of such an enclosure. In the following description, for purposes of explanation, specific numbers, dimensions, and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

Reference is now made to FIG. 1, wherein is illustrated a perspective view of a base 10, forming a portion of the present invention. Base 10 comprises a raised floor 11, a periphery 16, and a plurality of upwardly extending posts 12, where posts 12 reciprocally receive a plurality of self-clinching tanged openings 14 formed in a base electromagnetic interference (EMI) shield 15. It is anticipated that, according to the present invention, base 10 will comprise a molded plastic part, and that base EMI shield 15 may be formed of any thin, conductive, spring-steel material as is generally known, for example 0.020" 0.01 tin plated cold rolled steel shim stock. Base EMI shield 15 further comprises a plurality of planar, tabbed fingers 17 formed in peripheral edges of the shield 15, each finger 17 having a one or more hemispherical domes 18 proportionally disposed between lateral edges 19 of each finger 17, as more clearly shown in FIG. 1b. Fingers 17 are formed so as to conformally follow the outline of periphery 16 of base 10. Thereafter, shield 15 is positioned over base 10 and pressed into place such that posts 12 are received by tanged openings 14, the tang portions of openings 14 bearing against and gripping posts 12. In the preferred embodiment of the present invention, raised floor 11 is formed to position shield 15 at a specified height below the upper edge of periphery 16 such that the lateral edges 19 of each finger 17 remain recessed below the upper edges of periphery 16 of base 10. A principal advantage of forming base shield 15 in the above manner is that the lateral edges 19 of the thin shield material, which may be sharp, are not exposed when a top cover assembly (discussed in connection with FIG. 16 below) is removed from the computer enclosure. Risk of injury to the user or to an individual servicing the computer is thereby significantly reduced. Moreover, because lateral edges 19 of the EMI shield 15 are recessed, damage to shield 15 can be avoided when mounting or demounting the top cover because edges 19 are not exposed.

Base 10 further comprises an upwardly extending frame support member 20 and a plurality of panel-mounting openings 21 located at the rear portion of base 10. Base 10 also includes plurality of upwardly extending frame-mounting snaps 22 disposed at the front portion of base 10, as well as a plurality of cruciform-locating openings 23 positioned at the front of base 10 and in the frame support member 20 at the rear of base 10. In addition, base 10 also includes a plurality of frame-mounting openings 24 in the frame support member 20 substantially as shown. Further, at the rear portion of periphery 16 of base 10 are provided a plurality of hook-receiving openings 9 designed to receive and retain a plurality of panel-mounting hooks 37 (referred to and discussed in more detail in connection with FIG. 4 below).

Referring now to FIGS. 2a–2d, perspective views of a single-piece internal frame 25 are shown. It is intended that frame 25 function both as an internal chassis to which any number of subassemblies may be mounted in accordance with the teachings of the present invention discussed below, and also as a structural skeleton which imparts strength and rigidity to the entire computer housing when fully assembled. As preferred, frame 25 comprises a single, injection-molded plastic part formed of glass filled polycarbonate-ABS blend plastic. Although the material forming frame 25 possesses only a poor cosmetic finish, the glass filled particles within the glass filled polycarbonate-ABS blend plastic provides for greatly increased bending and torsional rigidity relative to ordinary ABS plastic. In addition, frame 25 constructed in accordance with the above material permits a considerable weight saving over that of a conventional metal chassis.

It should be noted that frame 25 may be dimensionally formed in any manner to receive the desired size and number of peripheral and functional subassemblies. As presently preferred, frame 25 comprises four peripheral subassembly bays 27, and a power supply bay 29 including an integral finger guard 26. Finger guard 26 aids in preventing a user or technician from inadvertently contacting a fan blade (not shown) within a power supply subassembly mounted within bay 29 (as shown in FIGS. 9a–b below), when the computer enclosure is opened for service. In addition, frame 25 comprises a plurality of circuit board retaining snaps 30 and a boss 31 to locate and secure a main processor board, as will be discussed in connection with FIG. 7 below). Each of the subassembly bays 27 further includes an integrally-formed subassembly retaining snap 28 having a latch head 28a designed to mate with and secure peripheral subassemblies (not shown) within bays 27 and 29, discussed in more detail below in connection with FIGS. 7–9.

Also formed in front and rear portions of frame 25 are a plurality of cruciforms 32, a plurality of frame-mounting snaps 33, and a plurality of frame-mounting openings 34, whose collective function is to secure frame 25 to base 10. Cruciforms 32, snaps 33, and openings 34 are designed to be respectively received by cruciform-locating openings 23 at the front of base 10 and in the frame support member 20 at the rear of base 10 (FIG. 1), the frame-mounting openings 24 in the frame support member 20 (FIG. 1), and the upwardly extending frame-mounting snaps 22 located at the front portion of base 10 (FIG. 1). Moreover, frame 25 includes a plurality of panel-mounting openings 26 located at the upper rear of frame 25, whose function will be described in FIG. 5a below.

Figure 3:
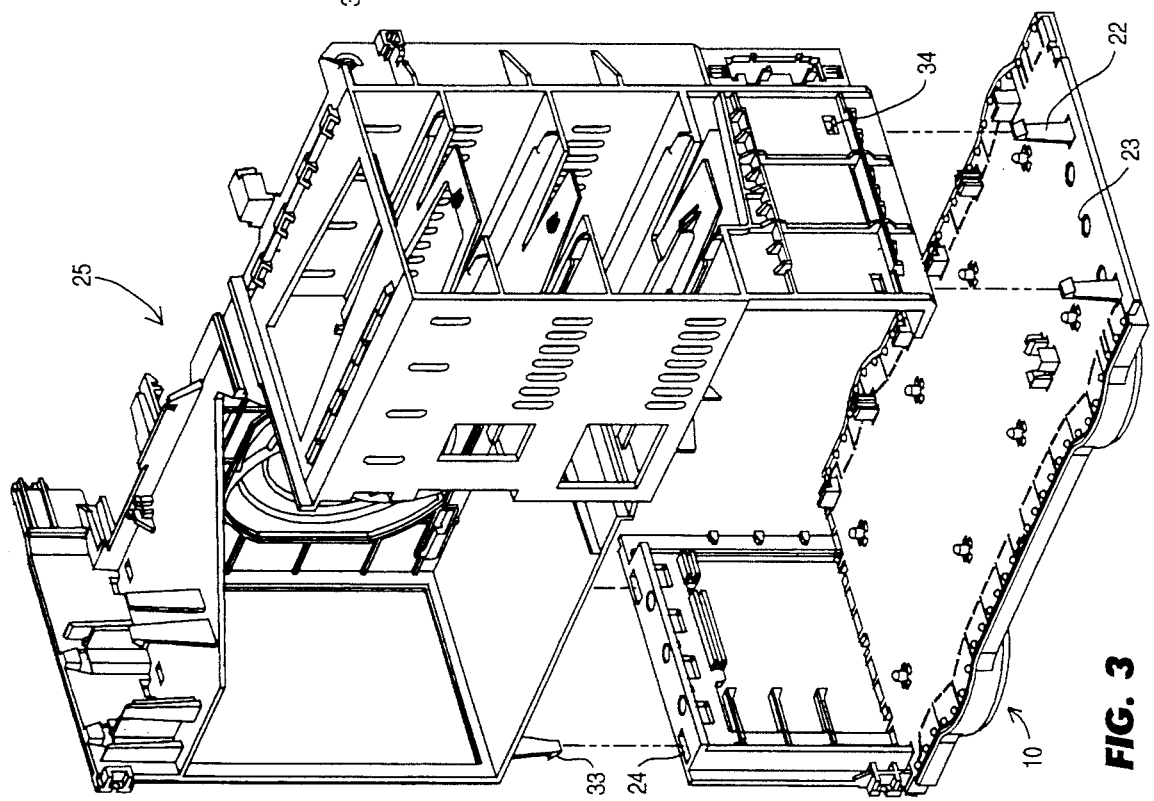
FIG. 3 illustrates mounting the frame to the base assembly.

Reference is now made to FIG. 3, wherein assembly of the frame 25 to base 10 is illustrated. Having formed frame 25 substantially as described above, frame 25 is first aligned above base 10 in conformance with all front and rear positioning and locking features (e.g., cruciforms 32 and cruciform-locating openings 23), and then lowered down onto base 10 such that positioning and locking features are mated and seated. In particular, cruciforms 32 at the front and rear of frame 25 will seat within cruciform-locating openings 23 at the front and rear of base 10, and frame-mounting snaps 33 on frame 25 will be received by frame-mounting openings 24 located in the frame support member 20 of base 10 (FIG. 1). Similarly, frame-mounting snaps 22 at the front portion of base 10 will be received by the frame-mounting openings 34 at the front of frame 25 (FIG. 1).

Referring now to FIG. 4, a rear panel 38 is illustrated having a numerosity of pin members 39 distributed over the interior surface 38a of panel 38. Rear panel 38 also comprises a plurality of panel-mounting snaps 36 and hooks 37 as shown. Snaps 36 and hooks 37 will be used to secure panel 38 to base 10 and frame 25 in substantially the same manner as securing frame 25 to base 10, as will be shown in FIG. 5a below. Also shown in FIG. 4 is a rear EMI shield 40, having, among other features, a plurality of snap-passthroughs 41 and through-holes 42 corresponding in number and location to pin members 39. When maneuvered into position relative to rear panel 38, through-holes 42 of rear shield 40 receive pin members 39, shield 40 seating upon a plurality of standoffs 45 disposed on interior surface 38a at a chosen distance. Having positioned rear shield 40 onto rear panel 38, pin members 39 are heat-staked in accordance with generally known plastics forming methods to form rivet-like structures to securely retain shield 40 against standoffs 45 panel 38, thereby forming a rear panel assembly 46. When thus assembled, panel-mounting snaps 36 extend freely through snap-passthroughs 41 so as to permit mounting assembly 46 to base 10 and frame 25, as will be discussed immediately below. As necessary, pieces of electrically conductive foam 44 may be placed between shield 40 and panel 38 to enhance EMI shielding qualities of rear panel assembly 46.

Figure 5A:
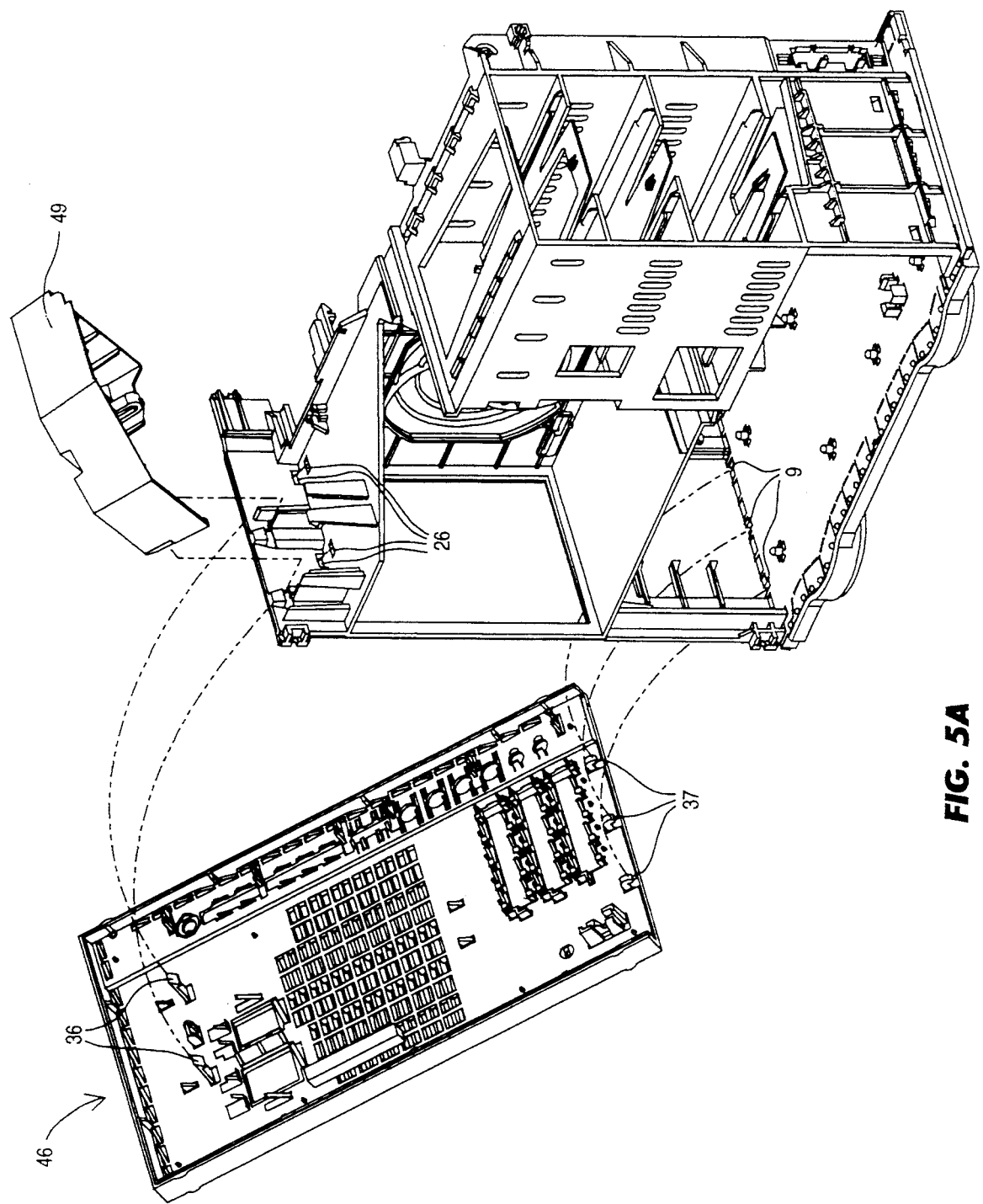
FIGS. 5a-b illustrates mounting the rear panel assembly to the base and frame to form a base-frame assembly.
Figure 5B:
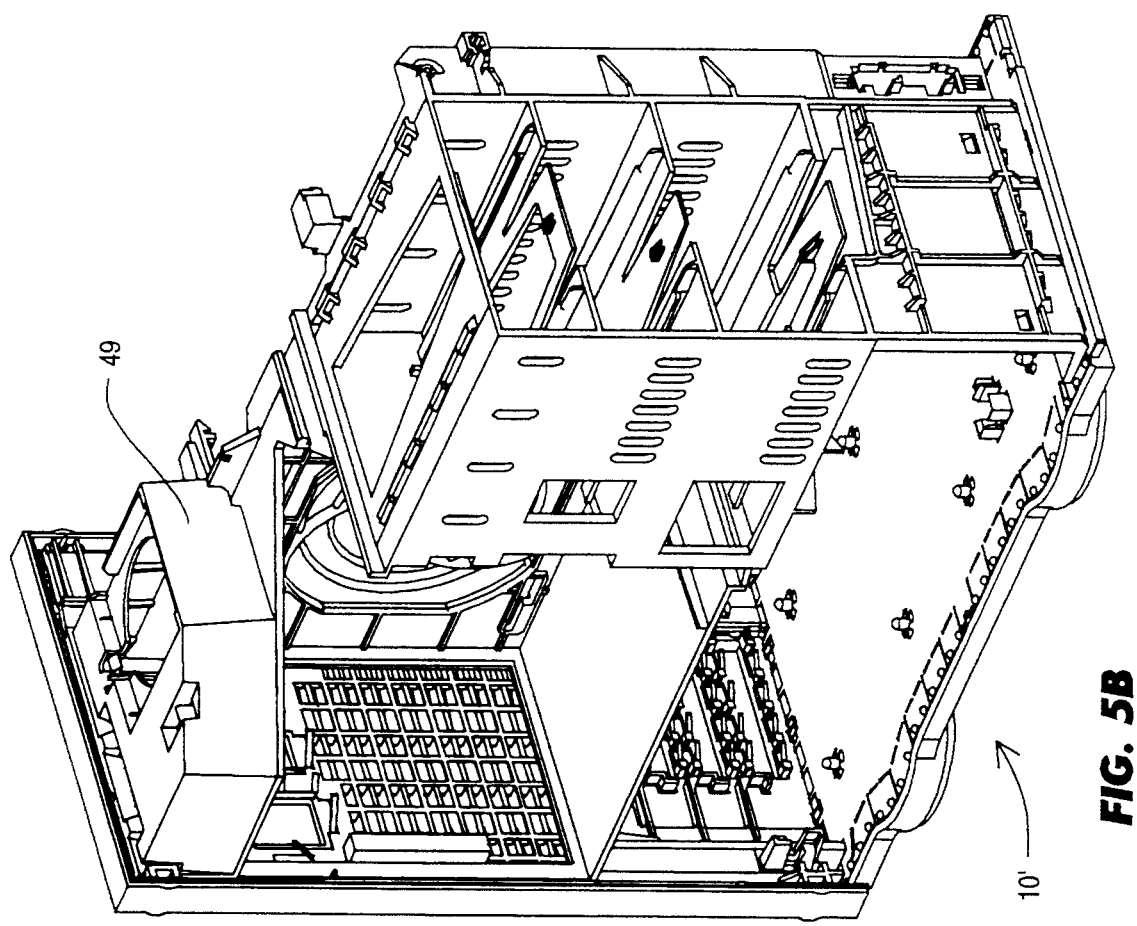

With reference now to FIGS. 5a–b, rear panel assembly 46 is obliquely positioned against the rearward facing surfaces of the prior-assembled base 10 and frame 25 such that hooks 37 on assembly 46 engage in hook-receiving openings 9 in base 10. Assembly 46 is thereafter rotated vertically about a horizontal axis extending through hooks 37 until it snugly bears against the rearward facing surfaces of base 10 and frame 25, whereby panel-mounting snaps 36 are received into panel-mounting openings 26 in frame 25. Once received within openings 26, gentle pressure is applied to assembly 46 until snaps 36 are positively engaged to retain assembly 46 on base 10 and frame 25. Thus assembled, base 10, frame 25, and rear panel assembly 46 together comprise a base-frame assembly 10' illustrated in FIG. 5b, to which may be now added a multiplicity of prior-assembled functional subassemblies, as shown and discussed in the following figures. For example, as shown in FIGS. 5a–b, a modular speaker housing 49 may be positioned within an appropriate space on frame 25, and locked into place.

Figure 15:
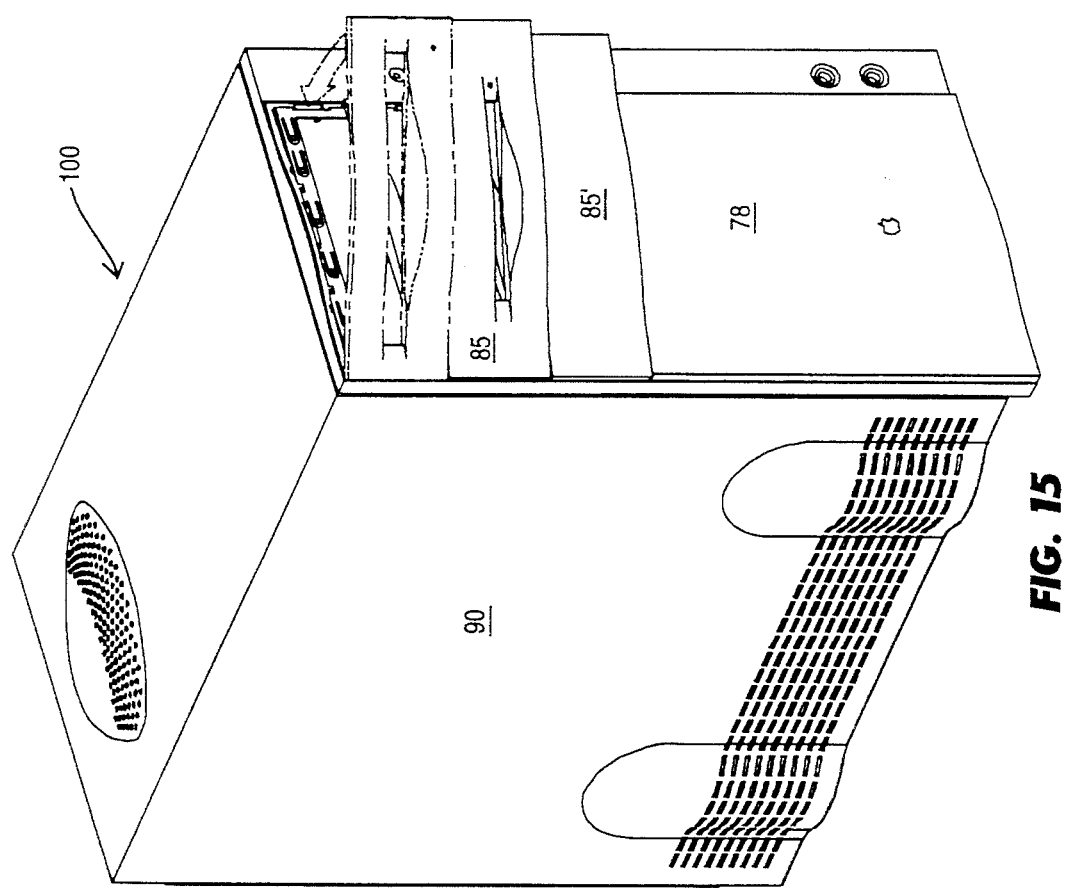
FIG. 15 illustrates the installation of bezels into the front panel assembly.
Figure 16B:
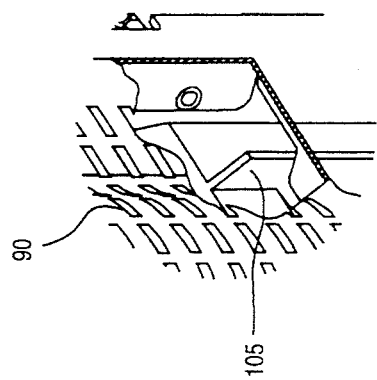
FIG. 16 illustrates the installation of the top cover assembly onto the base-frame assembly, completing the computer enclosure.

Reference is now made to FIGS. 6a–c, wherein are illustrated preparatory steps in forming a main circuit board subassembly 50, consisting illustratively of a main printed circuit board (PCB) 51, to which is attached a PCB protector 52 using a hook and snap attachment means fundamentally similar to that employed in attaching rear panel assembly 46 to base 10 and frame 25. The purpose of PCB protector 52 will be seen more clearly in FIG. 16b, wherein protector 52 guards main PCB 51 against damage when a top cover assembly, also discussed in connection with FIGS. 15–16, is lowered down upon base-frame assembly 10' when assembly thereof is substantially complete. Next, as shown in FIG. 6b, provision for electrical connection to all functional subsystems within the computer system is made by coupling an appropriately sized main cable bundle 53 to a main connector block 54 on main PCB 51. Main cable bundle 53 may be formed in any manner and size appropriate to the wiring requirements of the computer system being constructed. For example in FIG. 6b, cable bundle 53 may provide power and signal connection for floppy and fixed-head disk drives, Small Computer Serial Interface (SCSI) devices, and other devices by providing appropriate connectors 55 at various points in the cable bundle, as is generally known. Main cable bundle 53 will be routed to various subassemblies mounted within the interior portions of frame 25, and will be shown in greater detail in FIGS. 10a–b below. Additional wiring needs can be accommodated by providing and routing one or more secondary cable bundles between particular subassemblies, as for example direct power connection between the main processor board 51 and a power supply subassembly 35 (shown below), as suggested by secondary cables 57a and 57b in FIG. 6c.

Figure 7:
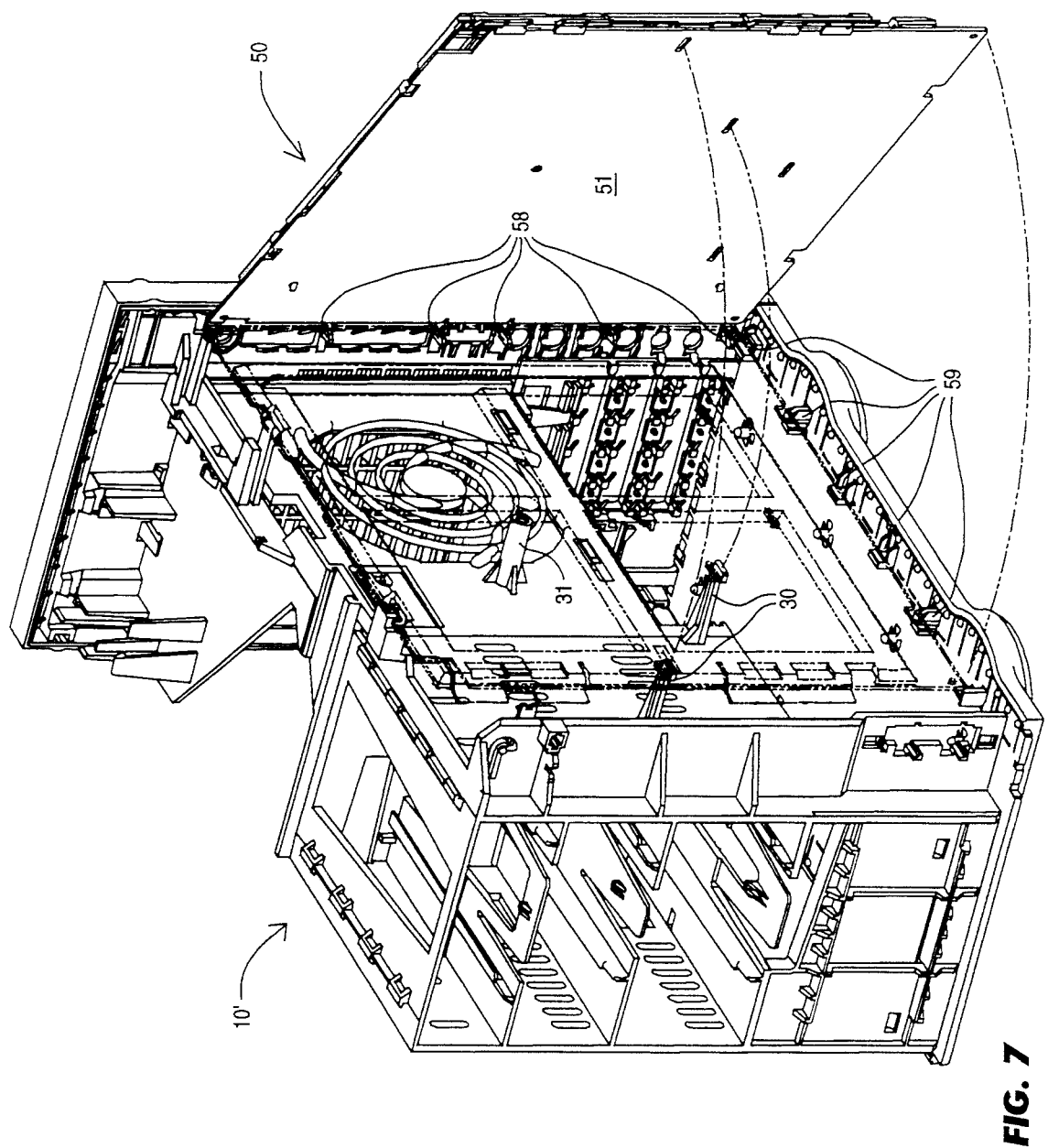
FIG. 7 shows the mounting of the main board assembly to the base-frame assembly.

In FIG. 7 is shown main processor board assembly 50 being mounted vertically to one side of base-frame assembly 10'. In FIG. 7, assembly 50 is first obliquely positioned received into and located by a first plurality of board guides 58 (comprising substantially grooved bosses) formed in a vertical line in rear panel assembly 46, and then pivoted about a vertical axis running through board guides 58 such that assembly 50 is received by the second plurality of board guides 59 formed in base 10, substantially as shown. Main processor board assembly 50 is then secured to base-frame assembly 10' by engaging circuit board retaining snaps 30 of frame 25 into appropriate openings in main processor board assembly 50, and then driving a threaded fastener into boss 31 in frame 25.

Figure 8:
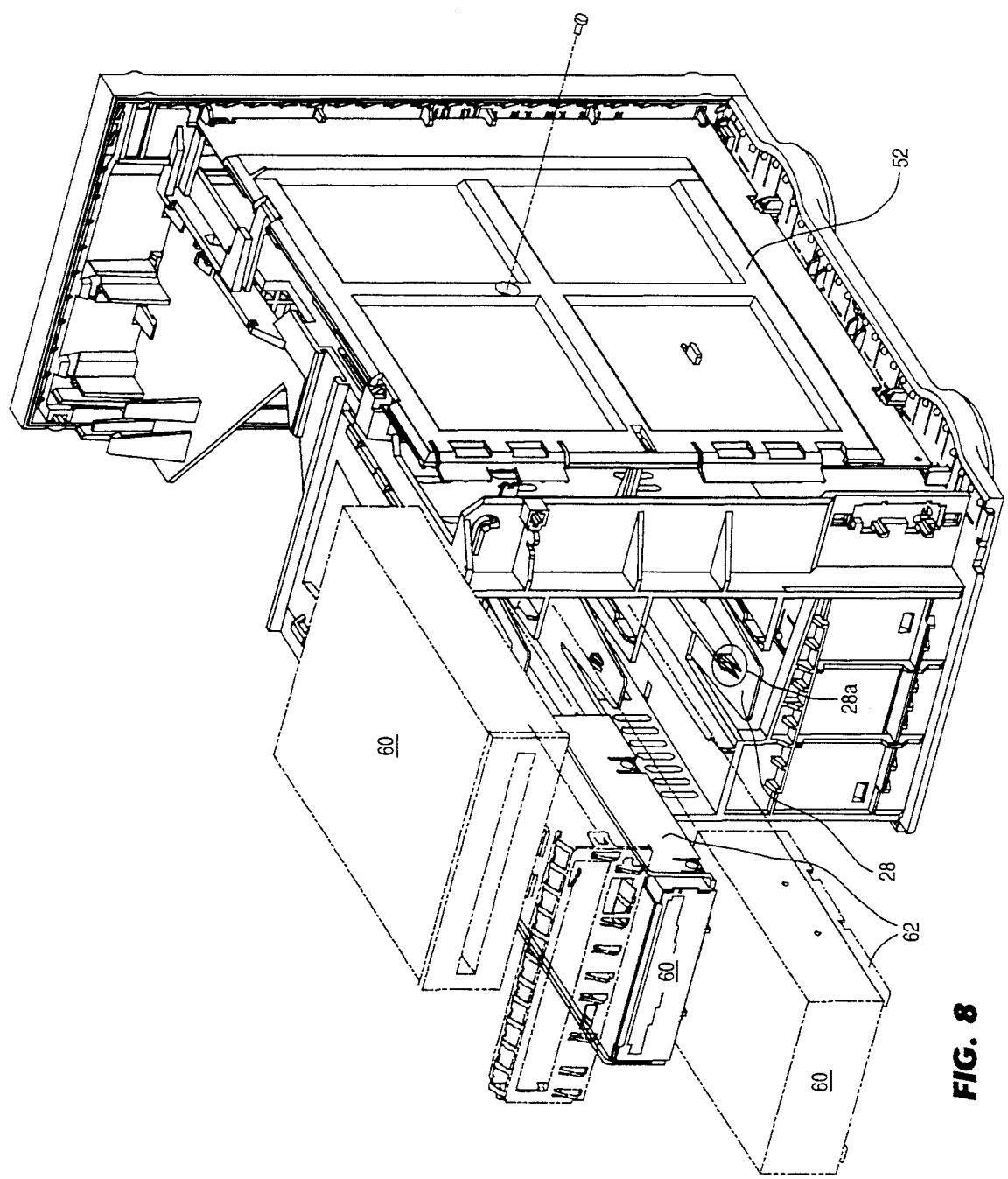
FIG. 8 illustrates installation of modular subassemblies within the base-frame assembly.
Figure 9A:
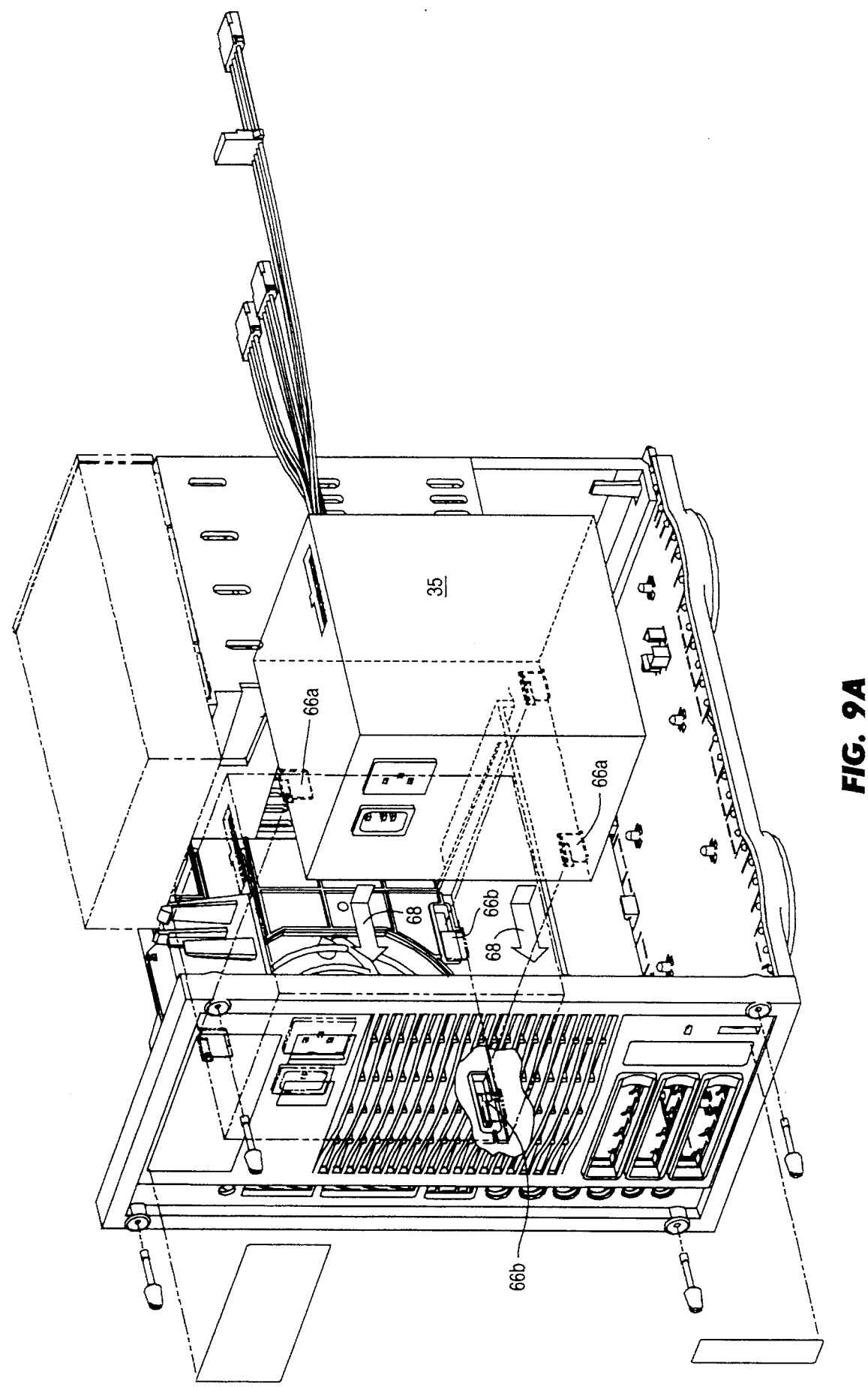
FIGS. 9a-b further illustrate installation of modular subassemblies within the base-frame assembly.
Figure 9B:
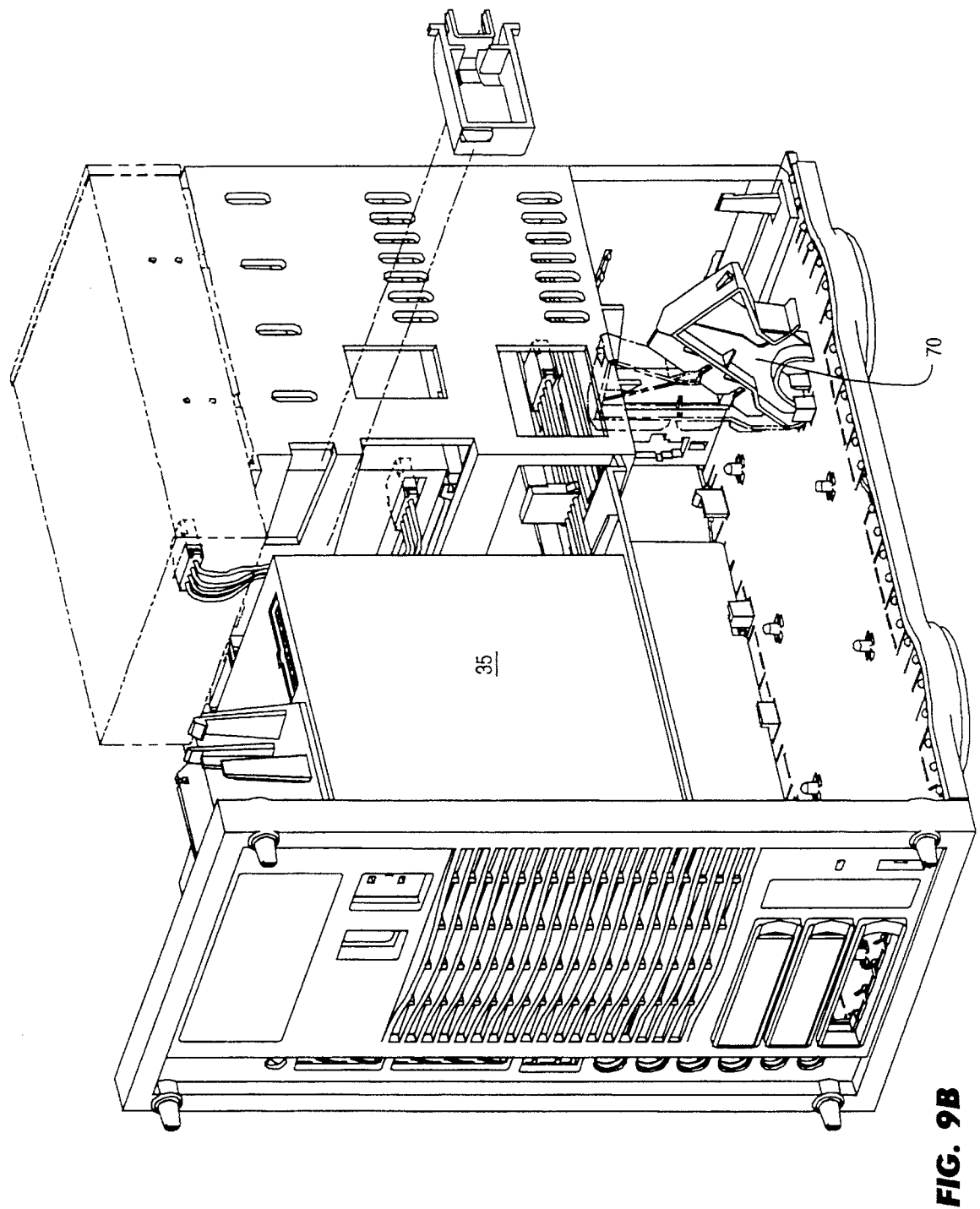
Figure 10B:
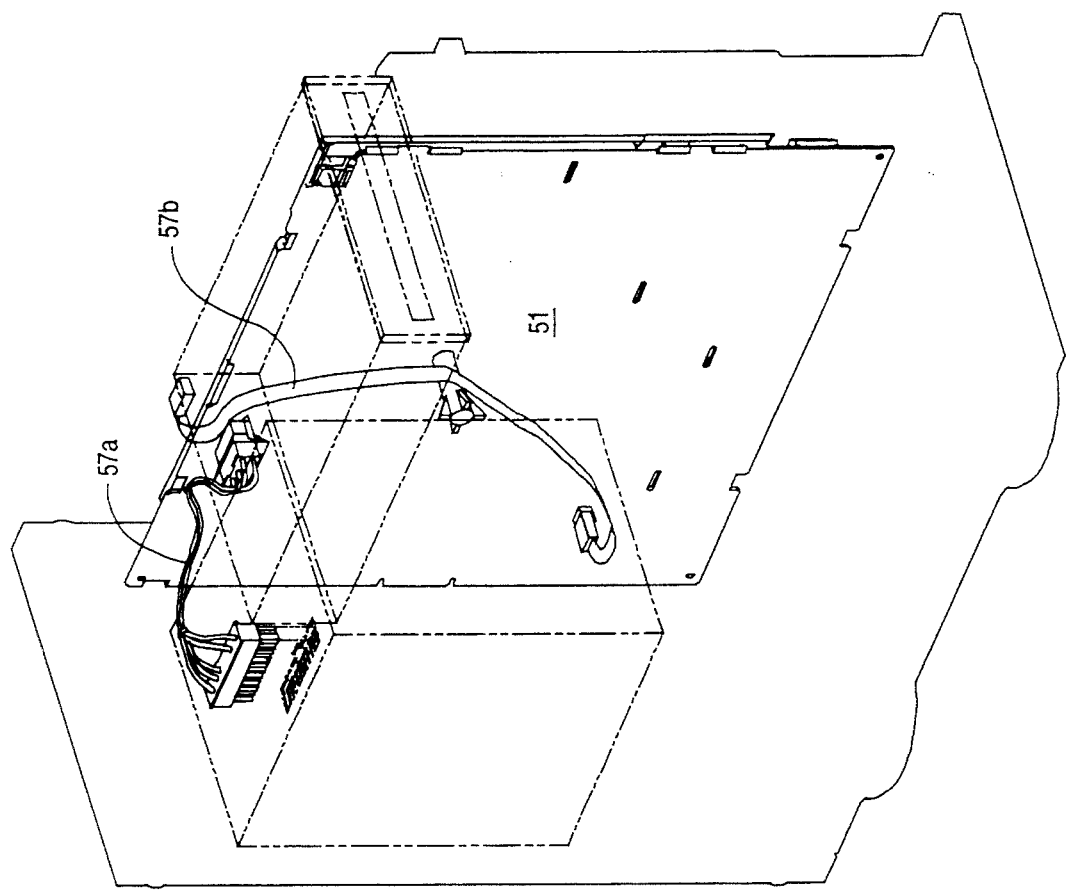
FIGS. 10a-b illustrate the installation of main and secondary cable assemblies within the base-frame assembly.
Figure 10A:
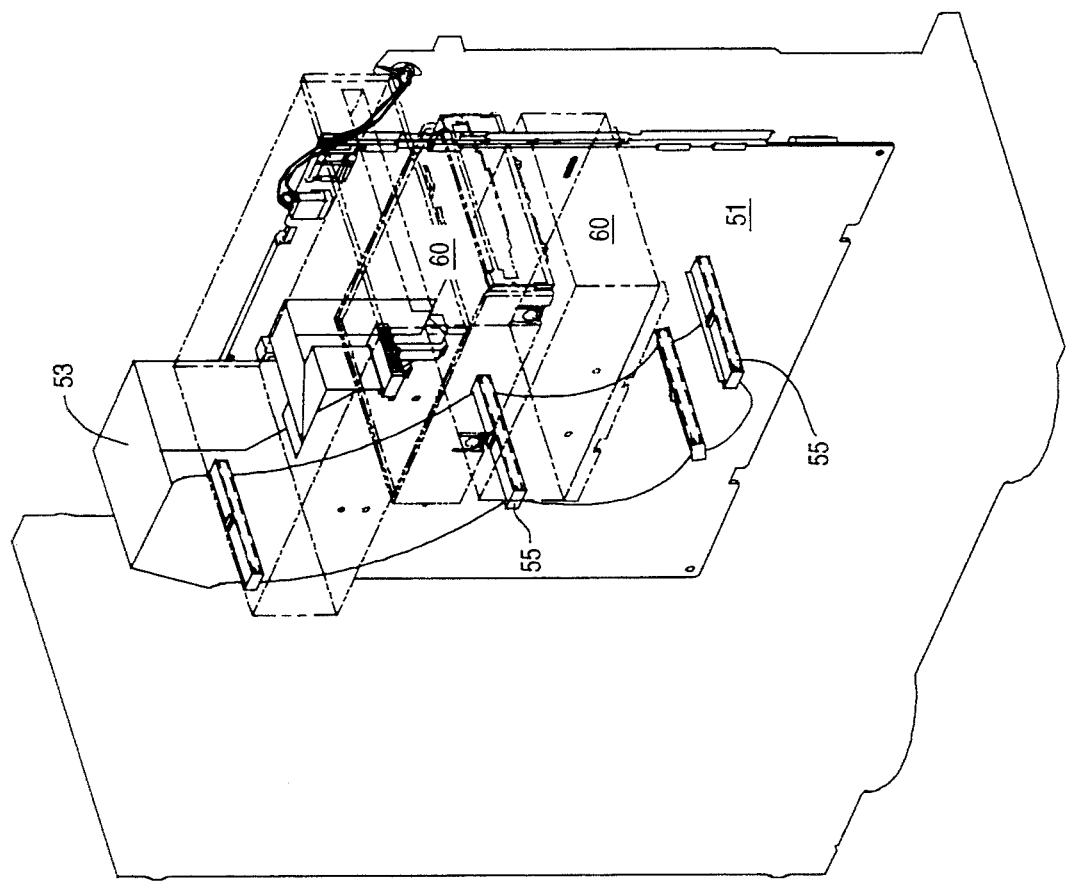

Referring now to FIGS. 8–10, any number of desired peripheral subassemblies 60 may be inserted in the respective bays 27, and rammed home, each subassembly thereby engaging a latch head 28a on the respective subassembly retaining snap 28. As is generally known, peripheral subassemblies 60 may require prior mounting to a carrier 62 before being inserted in bays 27. In general, carriers 62 should be designed to receive latch heads 28a of retaining snaps 28. Further, in FIG. 9a, a power supply module 35 having a plurality of L-shaped tabs 66a is inserted into the power supply bay 29 such that the L-shaped tabs 66a are received by a corresponding plurality of keyways 66b, as shown. Power supply module 35 is then urged rearward as suggested by arrows 68 until a power supply retaining snap 69, not visible in FIG. 9a but shown in FIGS. 2a and 2c–d, is deflected laterally as power supply module 35 moves past it, power supply retaining snap 69 snapping in place behind power supply module 35 and locking it in place. Thereafter, additional support structures may be snapped into place using the hook-and-snap scheme employed in connection with other subassemblies. Shown in FIG. 9b is a bracket 70, added to provide support for optional peripheral circuit boards (not shown) to be mounted within base-frame assembly 10' and operating on any of a variety of internal bus architectures, such as that defined by the NuBus ® protocol. Installation and support for such optional peripheral circuit boards must be anticipated in any modern personal computer system. In FIGS. 10a–b are shown completion of the steps of connecting the connectors 55 of main cable bundle 53 to the several subassemblies 60 mounted in base-frame assembly 10'. As suggested above in FIGS. 6a–c, secondary, direct wiring requirements may be fulfilled by routing secondary cables 57a and 57b between appropriate devices.

Figure 11:
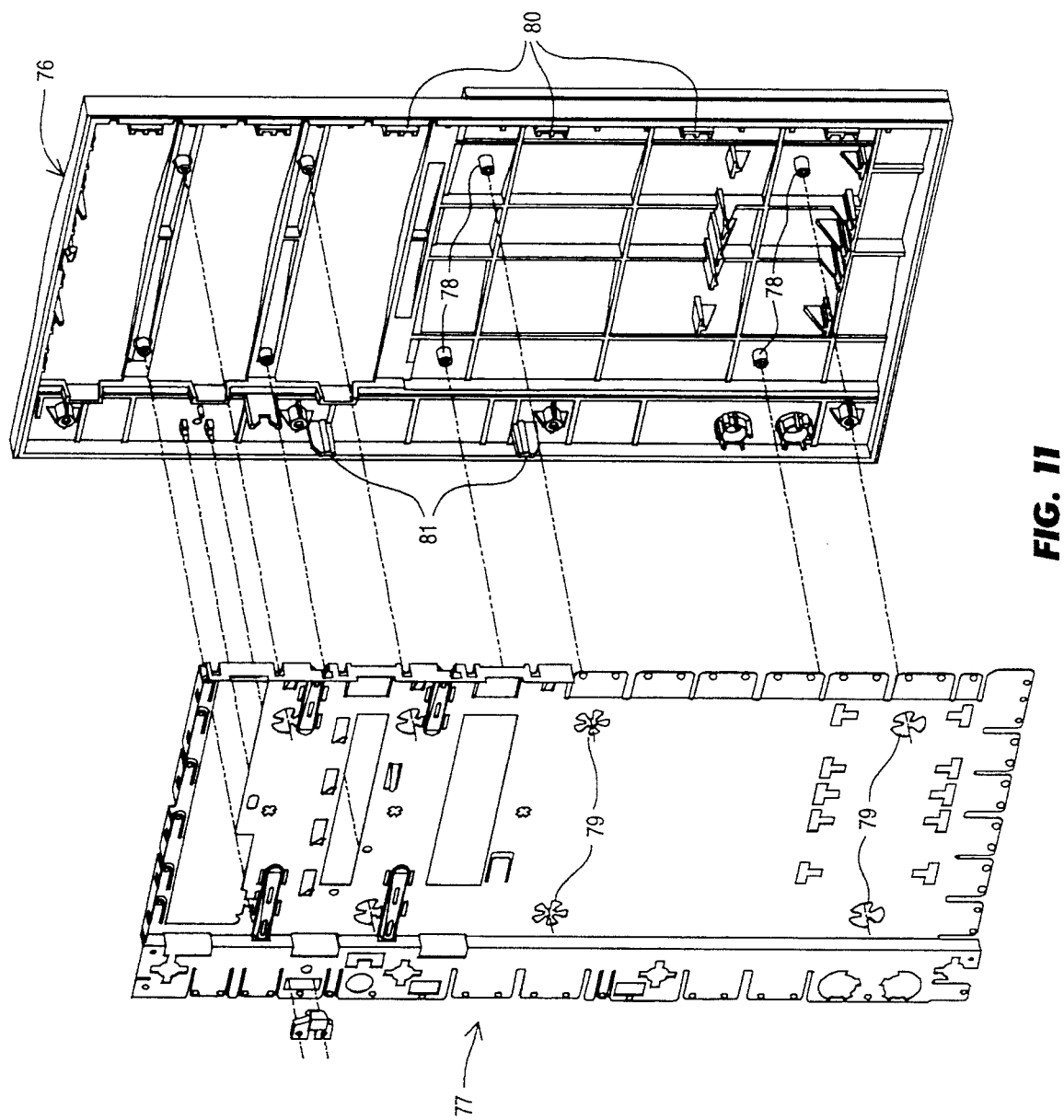
FIG. 11 illustrates the formation of a front panel assembly.

With reference to FIG. 11, assembly of a front panel assembly 75 is illustrated. In FIG. 11, a front panel 76 is formed substantially similar to rear panel 38, wherein front panel 76 is configured to receive a front EMI shield 77, which shield 77 is subsequently mounted and secured to panel 76 to form a front panel assembly 78. Accordingly, front panel 76 may comprise a plurality of upwardly extending posts 78 intended to reciprocally receive a plurality of self-clinching tanged openings 79 formed in front EMI shield 77, as shown. Alternatively, front panel 76 and shield 77 together may comprise a system of pin members and through-holes, as employed in the rear panel assembly 46 shown in FIG. 4 above. Front panel 76 also comprises a plurality of panel-mounting hooks 80 and snaps 81 as shown, which hooks 80 and snaps 81 will be used to secure front panel assembly 78 to a conformal U-shaped top cover 90 (shown in connection with FIGS. 12a–b and described immediately below), in substantially the same manner as securing rear panel assembly 46 to base-frame assembly 10' described in FIG. 5a above.

Referring now to FIGS. 12a–b, conformal U-shaped top cover 90 is formed in any generally known manner to enclose base-frame assembly 10'. Top cover 90 may be formed of any suitable material, but in a preferred embodiment comprises an electrically conductive, metallic cover to ensure sufficient shielding for EMI-reduction purposes. Front panel assembly 78 is subsequently obliquely positioned against frontward facing surfaces 91 of top cover 90 such that hooks 80 on assembly 78 engage in hook-receiving openings 93 in top cover 90. Assembly 78 is thereafter rotated about a vertical axis extending through hooks 80 until assembly 78 snugly bears against the balance of the frontward facing surfaces 91 of top cover 90, whereby panel-mounting snaps 81 are received into panel-mounting openings in top cover 90. Gentle pressure may then be applied to assembly 78 until snaps 81 are positively engaged to retain assembly 78 on cover 90. Alternatively, due to space limitations, it may not be feasible to employ cantilever snaps as just described, or as employed in mounting rear panel assembly 46 above. In such a case, a plurality of tab members 95 having through-holes 96 may be formed in cover 90 adjacent to frontward facing surfaces 91. Further, in lieu of snaps 81, front panel assembly may comprise a corresponding plurality of posts (not shown), which abut to tab members 95 and which receive thread-forming fasteners 98 to secure assembly 78 to cover 90. Where ruggedness of design warrants, fasteners 98 may, as in the preferred embodiment, comprise Torx ® high strength screws.

Figure 13A:
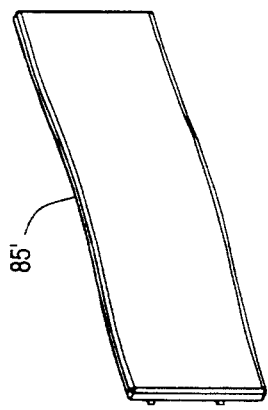
FIGS. 13a-b illustrate a first embodiment of a bezel.
Figure 13B:
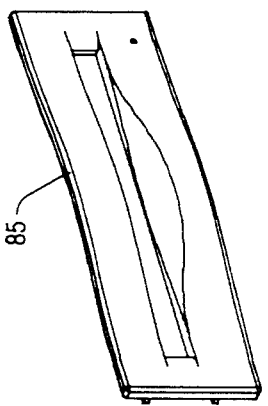

In FIGS. 13a–b are respectively shown front and rear perspective views of a first embodiment of a bezel 85 designed to conformally cover openings in front panel 76 through which removable mass storage media are passed to mass storage subassemblies installed in bays 27

Figure 14A:
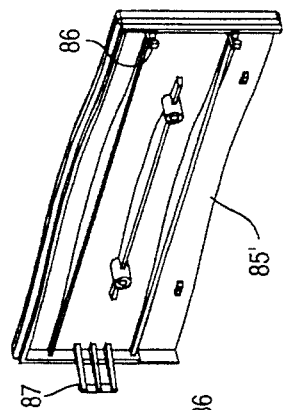
FIGS. 14a-b illustrate a second, alternative embodiment of a bezel.
Figure 14B:
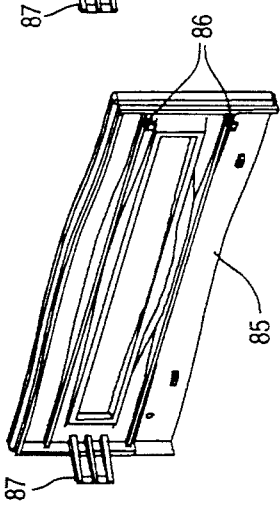

(FIG. 8 above). Alternatively, In FIGS. 14a–b, are shown front and rear perspective views of an alternative embodiment of a bezel 85' designed to conformally cover openings in front panel 76 through which no mass storage media are to be passed, there being, for example, a fixed-head disk drive subassembly installed in the corresponding bay 27. In either case, pairs of hooks 86 and snaps 87 are employed to engage and secure combinations of bezels 85 and 85' to front panel assembly 78 mounted to cover 90, in the fashion of front and rear panel assemblies 46 and 78, as suggested in FIG. 15. Appropriate EMI shielding may be attached to interior surfaces of bezels 85 or 85' as necessary to reduce emitted EMI. Thus configured, front panel assembly mated to cover 90 comprises a detachable, top cover assembly 100.

Figure 16A:
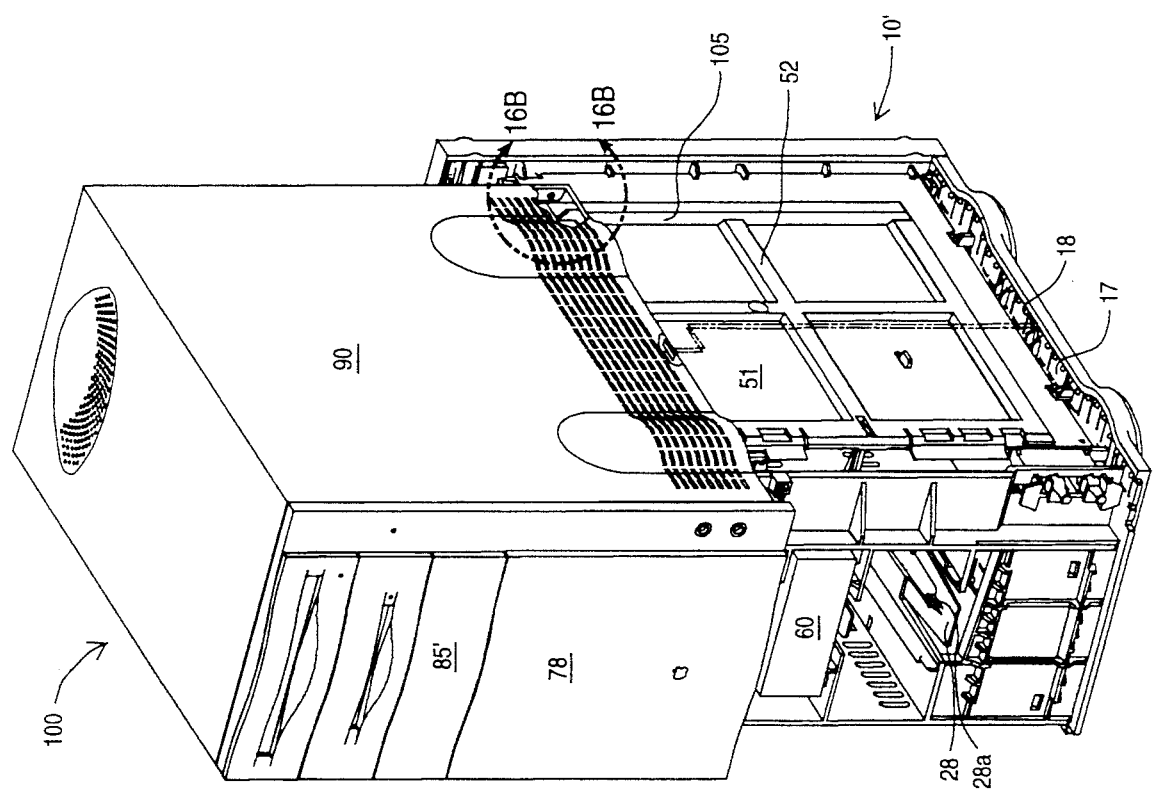

With reference to FIGS. 16a–b, final mounting of top cover assembly 100 to the built-up base-frame assembly 10' is shown. Top cover assembly 100 is first positioned substantially over base-frame assembly 10', and then lowered upon it, as shown. With brief reference to FIG. 16b, PCB protector 52 can be seen to guard against inadvertent damage to the main circuit board 51 by having vertically extending rib members 105 deflect the lateral sides of top cover assembly 100 away from board 51 as cover assembly 100 is lowered, as suggested by the cut-away detail in FIG. 16b. After cover assembly has been lowered into substantially its final position, the lower surfaces of top cover 90 will bear upon the hemispherical domes 18 on tabbed fingers 17 of base EMI shield 15 (FIG. 1b above). Because fingers 17 follow the outline of periphery 16 of base 10 to which top cover 90 conforms, top cover assembly 100 effectively completes the EMI shielding structure for the computer system when assembly 100 makes contact with base shield 15 and rear shield 40. Thereafter, top cover assembly 100 is slideably moved rearward upon a pair of inclined standoffs until the rear edges of assembly 100 contact a plurality of contact fingers (not shown) formed in the rear EMI shield 40, the top cover assembly 100 resting upon on the dome-like structures 18 of the base EMI shield fingers 17. The top cover assembly may then be securely fastened to the built up base-frame assembly 10' by driving conventional thumbscrews through the rear panel assembly 46 into complementary threaded through-holes (not shown) in the rear flange of the top cover 90, and by a lower edge of the front panel bearing against an extended lip formed in the front portion of base-frame assembly 10'.

Having thus described the assembly of a modular personal computer, the benefits of the foregoing design principles will be briefly discussed below. First, the modularity of the base-frame assembly 10' permits a user or service technician to easily access, remove and replace any functional subsystem without need for substantial disassembly of the computer system. Rather, having removed the top cover assembly 100, any subassembly 60 can replaced independently. For example, power supply subassembly 35 can be removed in the event of failure or upgrade without affecting any of the frontally mounted subassemblies 60. Second, a computer manufacturer assembling products in accordance with the above invention can more easily incorporate the latest system technologies, without requiring substantial modifications or refabrication of existing inventory of enclosures. Rather than having to dismantle an assembled system constructed according to the prior art, a manufacturer of products incorporating the present invention can simply remove the top cover assembly, remove the individual subassembly being updated, and reinstall the cover. For example, if main circuit board 50 undergoes a processor upgrade, a technician must only open the computer remove the existing circuit board, and install the new main circuit board 50 independent of the other subassemblies, thus saving time and costs.

The foregoing has described an arrangement for, and methods for assembling, a simple, light weight yet robust modular enclosure for a personal computer system, comprising essentially five snapped together structural pieces. The enclosure is designed to receive all functional components and subassemblies necessary to the operation of a personal computer system without limiting access to any other subassembly. As a result, a personal computer system designed and assembled in accordance with the present invention can be easily and inexpensively reconfigured and updated by the manufacturer, retailer, or end user without need for time consuming disassembly and assembly operations. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. In a personal computer system including a main processor board intercommunicating with a plurality of internal peripheral and functional subassemblies, a modular enclosure comprising:
   a base assembly further comprising:
      a base comprising a first interior surface having a first plurality of pin members disposed thereon;
      a base electromagnetic interference (EMI) shield mounted to said base, said base EMI shield comprising a first plurality of shield mounting openings receiving and retaining said first plurality of pin members;
      a first plurality of grooved board guides to receive and locate a first edge of said main processor board;
      a first plurality of frame mounting snaps,
      a first plurality of frame mounting openings,
      a first plurality of cruciform receiving openings;
      an upwardly extending frame support member having a second plurality of cruciform receiving openings; and,
      a first plurality of hook receiving openings;
   a unitary, internal frame mounted to said base assembly, said internal frame comprising:
      at least one bay designed to receive said internal peripheral and functional subassemblies;
      at least one subassembly retaining snap having a latch head;
      an integrally formed finger guard;
      first and second pluralities of cruciforms received and seated in said first and second pluralities of cruciform openings in said base assembly;
      a second plurality of frame mounting snaps received into said first plurality of frame mounting openings in said base assembly; and, a second plurality of frame mounting openings receiving said first plurality of frame mounting snaps in said base assembly;

a rear panel assembly mounted to said base assembly and said internal frame, comprising:
  a rear panel further comprising a second interior surface having a second plurality of pin members disposed thereon;
  a rear EMI shield mounted to said rear panel and comprising a second plurality of shield mounting openings receiving and retaining said second plurality of pin members;
  a first plurality of panel mounting hooks received into said first plurality of hook receiving openings in said base; and,
  a second plurality of grooved board guides to receive and locate a second edge of said main processor board; and, a top cover assembly, comprising a U-shaped top cover and a front panel assembly, mounted to said base assembly, said internal frame, and said rear panel assembly:
  said U-shaped top cover comprising left, right, and top surfaces, and having open front, rear, and bottom regions disposed between said left, right, and top surfaces, said top cover further comprising: a second plurality of hook receiving openings; and,
  a plurality of front panel retaining tabs;
  said front panel assembly comprising:
    a front panel further comprising a third plurality of pin members;
    a front EMI shield mounted to said front panel and comprising a third plurality of shield mounting openings receiving and retaining said third plurality of pin members;
    a second plurality of panel mounting hooks received into said second plurality of hook openings in said top cover; and,
    a plurality of panel mounting posts received and retained against said front panel retaining tabs on said front panel assembly.

2. The enclosure system as set forth in claim 1, wherein said base EMI shield comprises:
  a main shield portion; and,
  a shield periphery laterally bounding said main shield portion and comprising a plurality of tabbed fingers coplanar with and extending outward from said main portion, said tabbed fingers further comprising a top side with at least one hemispherical dome structure disposed thereon.

3. The enclosure system as set forth in claim 2, wherein the base further comprises:
  a raised floor extending substantially over said first interior surface and substantially receiving said main shield portion of said base EMI shield;; and,
  a base periphery extending circumferentially around said raised floor and having a rim, said base periphery substantially comprising a recessed groove to receive said plurality of tabbed fingers such that said top sides and hemispherical domes are disposed in said base periphery below said rim,
said top cover assembly riding on said hemispherical domes when said top cover assembly is mounted to said base, frame, and panel assemblies.

4. In a personal computer system including a main processor board intercommunicating with a plurality of internal peripheral and functional subassemblies, a method for assembling a modular enclosure comprising the steps of:
  providing a base assembly comprising:
    a base comprising a first interior surface having a first plurality of pin members disposed thereon;
    mounting to said base a base electromagnetic interference (EMI) shield comprising a first plurality of shield mounting openings receiving and retaining said first plurality of pin members;
    receiving and locating a first edge of said main processor board by a first plurality of grooved board guides;
    providing first pluralities of frame mounting snaps, frame mounting openings, hook receiving openings, and cruciform receiving openings, and
    forming an upwardly extending frame support member having a second plurality of cruciform receiving openings;
  mounting to said base a unitary, internal frame comprising at least one bay designed to receive said internal peripheral and functional subassemblies, and at least one subassembly retaining snap having a latch head;
  forming an integrally formed finger guard;
  providing first and second pluralities of cruciforms for receiving and seating in said first and second pluralities of cruciform openings in said base assembly;
  providing a second plurality of frame mounting snaps to be received into said first plurality of frame mounting openings in said base assembly; and,
  providing a second plurality of frame mounting openings for receiving said first plurality of frame mounting snaps in said base assembly;
  mounting, to said base assembly and said internal frame, a rear panel assembly comprising a rear panel having a second interior surface including a second plurality of pin members disposed thereon;
  mounting, to said rear panel, a rear EMI shield comprising a second plurality of shield mounting openings receiving and retaining said second plurality of pin members;
  receiving a first plurality of panel mounting hooks into said first plurality of hook receiving openings in said base; and,
  locating a second edge of said main processor board within a second plurality of grooved board guides; and,
  mounting, to said base assembly, internal frame, and rear panel assemblies, a top cover assembly comprising a U-shaped top cover and a front panel assembly;
  providing, on said U-shaped top cover, left, right, and top surfaces, and providing further open front, rear, and bottom regions disposed between said left, right, and top surfaces;
  providing further, on said U-shaped top cover, a second plurality of hook receiving openings and a plurality of front panel retaining tabs;
  providing, on said front panel assembly, a front panel further comprising a third plurality of pin members;
  providing further a front EMI shield mounted to said front panel and comprising a third plurality of shield mounting openings receiving and retaining said third plurality of pin members;

receiving a second plurality of panel mounting hooks into said second plurality of hook openings in said top cover; and, receiving and retaining a plurality of panel mounting posts, disposed on said front panel, against said front panel retaining tabs on said front panel assembly.

5. The method as set forth in claim 4, further comprising the steps of:

forming, in said base EMI shield, a main shield portion and a shield periphery laterally bounding said main shield portion and providing a plurality of tabbed fingers coplanar with and extending outward from said main shield portion, said tabbed fingers further comprising a top side with at least one hemispherical dome structure disposed thereon.

6. The method as set forth in claim 5, further comprising the steps of:

extending a raised floor substantially over said first interior surface and substantially receiving said main shield portion of said base EMI shield;

extending a base periphery having a rim circumferentially around said raised floor to substantially form a recessed groove, and, receiving said plurality of tabbed fingers such that said top sides and hemispherical domes are disposed in said base periphery below said rim, said top cover assembly riding on said hemispherical domes when said top cover assembly is mounted to said base, frame, and panel assemblies.

* * * * *